(12) United States Patent
Van Erp

(10) Patent No.: US 12,161,143 B2
(45) Date of Patent: Dec. 10, 2024

(54) APPARATUS AND RELATED INDUSTRIAL APPLICATIONS WITH SOLID-STATE RF ENERGY TECHNOLOGY

(71) Applicant: GEA FOOD SOLUTIONS BAKEL B.V., Bakel (NL)

(72) Inventor: Joost Van Erp, Nuenen (NL)

(73) Assignee: GEA FOOD SOLUTIONS BAKEL B.V., Bakel (NL)

( * ) Notice: Subject to any disclaimer, the term of this patent is extended or adjusted under 35 U.S.C. 154(b) by 893 days.

(21) Appl. No.: 16/608,332

(22) PCT Filed: May 9, 2018

(86) PCT No.: PCT/EP2018/062002
§ 371 (c)(1),
(2) Date: Oct. 25, 2019

(87) PCT Pub. No.: WO2018/206642
PCT Pub. Date: Nov. 15, 2018

(65) Prior Publication Data
US 2020/0178578 A1    Jun. 11, 2020

(30) Foreign Application Priority Data
May 9, 2017 (EP) .................................... 17170103

(51) Int. Cl.
*H05B 6/64* (2006.01)
*A21D 15/06* (2006.01)
(Continued)

(52) U.S. Cl.
CPC ................ *A23L 5/34* (2016.08); *A21D 15/06* (2013.01); *A23L 3/01* (2013.01); *A23L 5/15* (2016.08);
(Continued)

(58) Field of Classification Search
CPC ..... A23L 5/34; A23L 3/01; A23L 5/15; A21D 15/06; C11B 1/12; H05B 6/6402;
(Continued)

(56) References Cited

U.S. PATENT DOCUMENTS 4,457,220 A     7/1984  Entremont et al.
4,631,380 A *  12/1986  Tran ...................... H05B 6/784
                                                              219/700
(Continued)

FOREIGN PATENT DOCUMENTS

CN     102986756 A    3/2013
CN     105698228 A    6/2016
(Continued)

OTHER PUBLICATIONS

Spinner, RF technology kills bugs and pathogens in food (https://www.foodnavigator.com/Article/2014/04/15/Food-decontamination-technology-uses-radio-frequency (Year: 2014).*
(Continued)

*Primary Examiner* — Drew E Becker
(74) *Attorney, Agent, or Firm* — The Dobrusin Law Firm, P.C.

(57) ABSTRACT

The present invention relates to a processing apparatus, in which a substance is preferably heated, cooked, dried, disinfected and/or pasteurized, sterilized. The present invention further relates to a method to treat a substance with radio-frequency waves.

20 Claims, 8 Drawing Sheets

(51) Int. Cl.
*A23L 3/01* (2006.01)
*A23L 5/10* (2016.01)
*A23L 5/30* (2016.01)
*C11B 1/12* (2006.01)
*H05B 6/78* (2006.01)

(52) U.S. Cl.
CPC .............. *C11B 1/12* (2013.01); *H05B 6/642* (2013.01); *H05B 6/645* (2013.01); *H05B 6/6467* (2013.01); *H05B 6/782* (2013.01)

(58) Field of Classification Search
CPC .................. H05B 6/642; H05B 6/6432; H05B 6/6447–6467; H05B 6/78–788
See application file for complete search history.

(56) References Cited

U.S. PATENT DOCUMENTS

| | | | |
|---|---|---|---|
| 5,253,567 A | 10/1993 | Gunawardena | |
| 6,246,040 B1 | 6/2001 | Gunn | |
| 6,638,475 B1 * | 10/2003 | Lagunas-Solar | H05B 6/806 |
| | | | 204/164 |
| 11,503,953 B2 * | 11/2022 | Van Erp | A47J 37/1266 |
| 11,533,925 B2 * | 12/2022 | Van Erp | A23L 3/365 |
| 2004/0016744 A1 * | 1/2004 | Ottaway | H05B 6/60 |
| | | | 219/399 |
| 2005/0260307 A1 * | 11/2005 | Linn | H05B 6/782 |
| | | | 426/241 |
| 2006/0006172 A1 | 1/2006 | Sedlmayr | |
| 2011/0033584 A1 | 2/2011 | Bilchinsky et al. | |
| 2011/0159103 A1 | 6/2011 | Akashe et al. | |
| 2012/0103975 A1 | 5/2012 | Okajima | |
| 2012/0164022 A1 * | 6/2012 | Muginstein | H05B 6/72 |
| | | | 405/128.7 |
| 2013/0206749 A1 * | 8/2013 | Libman | H05B 6/686 |
| | | | 219/553 |
| 2015/0271877 A1 | 9/2015 | Johansson | |
| 2015/0313273 A1 | 11/2015 | Stromotich et al. | |
| 2016/0278170 A1 | 9/2016 | Atherton et al. | |
| 2016/0324195 A1 | 11/2016 | Simunovic et al. | |
| 2017/0055766 A1 * | 3/2017 | Grimaldi | H05B 6/60 |
| 2018/0099431 A1 * | 4/2018 | Gartz | H05B 6/708 |
| 2018/0152997 A1 * | 5/2018 | Carcano | H05B 6/6411 |
| 2023/0180797 A1 * | 6/2023 | Tang | A23L 3/0155 |
| | | | 426/241 |

FOREIGN PATENT DOCUMENTS

| | | | | |
|---|---|---|---|---|
| CN | 205505111 U | 8/2016 | | |
| EP | 2322883 A1 | 5/2011 | | |
| FR | 2264494 A1 | 10/1975 | | |
| GB | 2098040 A | 11/1982 | | |
| JP | H07255388 A | 10/1995 | | |
| RO | 125073 B1 | 9/2010 | | |
| WO | WO-2007096877 A2 * | 8/2007 | ............... | A23L 3/01 |
| WO | 2009/116923 | 9/2009 | | |
| WO | 2014/147651 | 9/2014 | | |
| WO | 2016/091882 A1 | 6/2016 | | |
| WO | 2016/100539 | 6/2016 | | |

OTHER PUBLICATIONS

Hou et al., Radio frequency heating for postharvest control of pests in agricultural products: A review (Year: 2015).*
International Search Report and Written Opinion for International Application No. PCT/EP2018/062002, dated Jun. 29, 2018.
International Preliminary Report on Patentability for International Application No. PCT/EP2018/062002, dated Aug. 20, 2019.
Yadav Deep et al—Microwave technology for disinfestation of cereals and pulses, pp. 3568-3576, dated Dec. 16, 2012.
Chinese Office Action dated Apr. 28, 2023, for Chinese Application 201880030404.1.
Examination Report for EP Application No. 18 722 559.4-1105, dated Feb. 17, 2023.

* cited by examiner

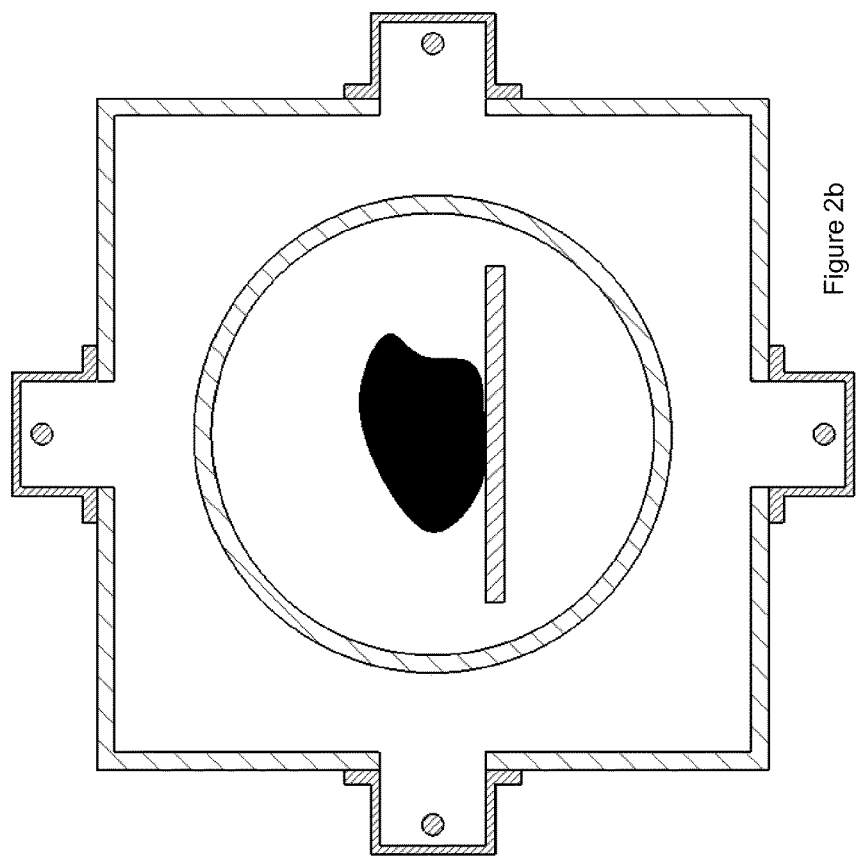
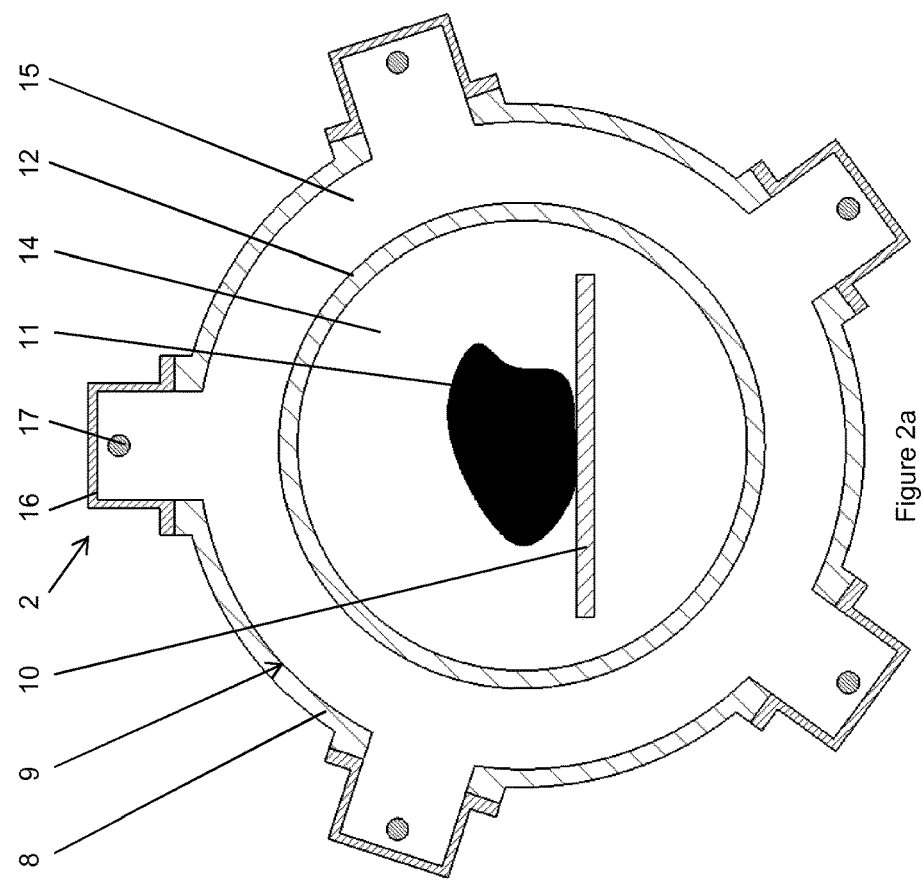
Figure 2a
Figure 2b

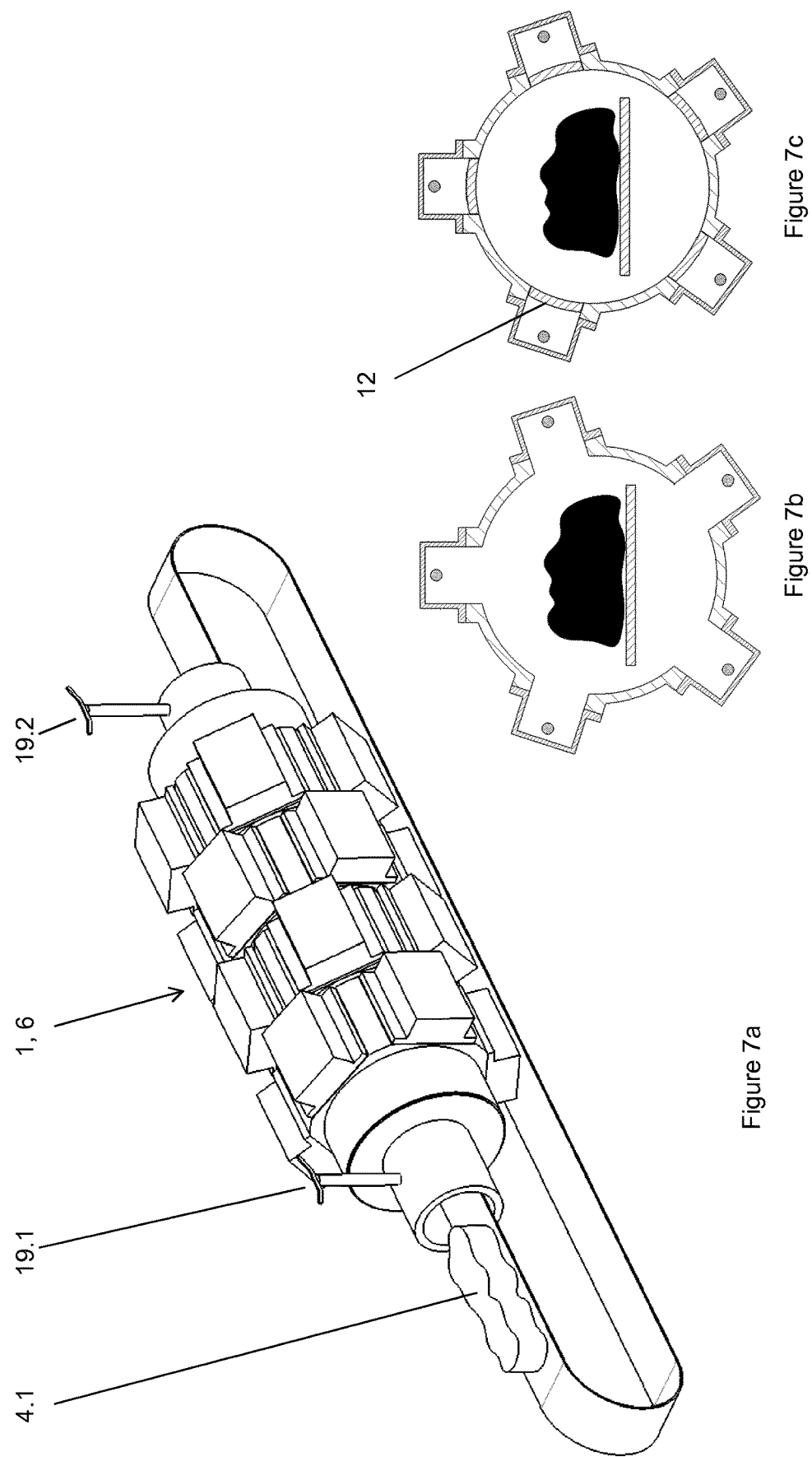

APPARATUS AND RELATED INDUSTRIAL APPLICATIONS WITH SOLID-STATE RF ENERGY TECHNOLOGY

The present invention relates to a processing apparatus, in which a substance is preferably heated, cooked, dried, disinfected and/or pasteurized, sterilized. The present invention further relates to a method to treat a substance with radio-frequency waves.

Treating products by passing microwave radiation through the products is common as well as in domestic as in industrial applications. A conventional microwave oven for instance comprises a magnetron which produces the microwave energy. However, in industrial applications wherein microwaves are generated by a magnetron the long operating times will result in undesirable heat development and/or the process is not sufficiently controllable. Additionally, undesired hot spots may occur It is therefore the objective of the present invention to provide a processing apparatus and a method that do not comprise the deficiencies according to the state in the art.

The problem is attained with a processing apparatus, in which a substance is preferably heated, cooked dried, disinfected, pasteurized and/or sterilized, characterized in, that it comprises at least one, preferably a multitude, solid-state radio frequency source(s).

The disclosure made regarding this subject matter of the present invention also applies to the other invention and vice versa. Subject matters disclosed regarding this invention can also be combined with subject matters from other inventions of the present application.

The present invention relates to a processing apparatus with a solid-state radio frequency (RF)-transistor(s) in a RF power amplifier. A radio frequency power amplifier is an electronic amplifier, that converts a low power radio frequency signal into a higher power signal. Typically, RF-power amplifiers drive the antenna of a transmitter. The antenna can be coupled to and/or located in a waveguide, wherein the antenna can radiate the microwaves into the waveguide which preferably is designed of reflective material and can guide the microwaves to a desired location, for example into the product chamber wherein the products to be treated are located. Compared to a magnetron, an advantages of a solid-state RF energy technology is a low voltage drive, semiconductor reliability and lower energy consumption due to the advanced control system. The inventive apparatus can be used to for example heat, cook, dry disinfect, pasteurize and/or sterilize a substance. The substance is preferably an edible product for human- and/or animal-consumption, particularly protein containing food product, particularly meat. The meat can be meat at a bone, muscle meat and/or minced meat. The product can also be fish and/or dough.

The substance can also comprise at least parts of an insect or a mixture of insects. Those insects are preferably supplied alive to the inventive apparatus or line and are killed by microwave radiation.

According to a preferred embodiment of the present invention, the inventive apparatus may not only comprise one but a multitude of solid-state radio frequency sources. This can be accomplished by using one or more antennas and/or one or more waveguides. Each radio frequency source can be preferably powered individually and each radio frequency source can be preferably controlled, more preferably closed loop controlled, individual. The wavelength, amplitude and/or the direction of the radiation can be controlled.

The solid-state radio frequency sources are preferably provided in an array of n columns and m rows, wherein n is an integer >1 and m is an integer >1. Preferably, the solid-state radio frequencies are arranged equidistantly in one row and/or the columns are also arranged equidistantly. In case a multitude of sources, they can be arranged at random.

Preferably, the solid-state radio frequency sources are provided equidistantly around the circumference of product chamber. In this chamber, the edible product to be treated will be placed or it will be transported through this product chamber.

According to a preferred embodiment, the processing apparatus comprises an inlet and an outlet, which are spaced apart from each other. The, preferably edible, substance enters the apparatus, preferably a product chamber through the inlet, passes through the apparatus/product chamber and then exits the apparatus/product chamber through the exit which is different from the inlet.

Preferably, the inventive processing apparatus comprises means to transport the substance past the solid-state radio frequency source(s). These means can be a tube and a pump, which pumps the substance through the tube. The tube is in the present case the product chamber. Preferably, the tube is at least partially made from a material, that is at least partially transmittable, preferably transparent for the RF-radiation. The tube can for example be made from a plastic material, preferably from a food grade plastic material. The pump pumps the substance preferably as a continuous or semi-continuous stream past the RF-source(s). The speed at which the product is pumped is preferably adjustable, so that the residence time in the product chamber can be varied. The means can also be a conveyor, for example a belt, preferably an endless belt or an endless chain, wherein the chain is preferably not made from a metal material. The conveyor is preferably at least partially transmittable for the RF-radiation. This conveyor transports the edible product, preferably as individual portions, past the solid-state radio frequency source(s). The products are preferably transported continuously or intermittently by the conveyor. The speed of the conveyor is preferably adjustable, so that the residence time in the product chamber can be varied.

According to another preferred embodiment of the present invention, the substance is provided as a batch, which is placed in the vicinity of the solid-state radio frequency source(s), preferably an array of solid-state radio frequency sources. The batch can be for example a bucket, a trough or the like, with the substance in it. The solid-state radio frequency can for example be moved towards the edible material after it has been placed into the vicinity of the solid-state radio frequency source. At least a part of the solid-state radio frequency source(s) can be fixed to a frame of the inventive apparatus, which can be reciprocated between a remote- and an operating-position. In the remote position, the batch can be place in or near the apparatus and then the solid-state radio frequency source(s) are moved into their operating position.

Preferably, the processing apparatus comprises a control system to control the solid-state radio frequency sources. The control system preferably comprises one or more sensors, whose signal(s) is used to control one or more solid-state radio frequency source(s), preferably individually and/or related to each other. For instance, in an application pumping a mass through a tube, gradually heating of the mass can be achieved by controlling the electromagnetic fields by controlling the power level, frequency and/or phase versus time with such precision that, for example, an even energy distribution in the product chamber or in the product will be achieved. The RF-energy load can be adapted to the progress of the treatment process. For instance, during cooking the RF-energy load can change. This change in load can be detected, for example via the antenna by measuring the reflected energy. The control system will compare the transmitted energy via the antenna with the reflected energy and will consequently adjust the energy to be transmitted by the antenna. At each solid-state RF energy sources, the amplitude, the frequency and/or the phase can be controlled individually and/or in groups. The antenna may function as a sensor, for example to detect the radiation reflected from the substance to be treated.

The sensor can sense one or more properties of the substance, for example its temperature and/or the energy absorbed by the substance. One sensor can measure what kind of radiation is reflected from the substance, for example the wavelength. In case the substance is transported during its treatment with the RF-radiation, there can be multiple sensors along the transportation path. The local reading of the sensors can be used to control the corresponding local solid-state radio frequency source(s) and/or the solid-state radio frequency source(s) upstream and/or downstream from the respective sensor.

The inventive processing apparatus is preferably part of a food production line, which comprises one or more treatment stations, for example a cutting- or grinding-station, a forming station, a batter-station and/or a marination-station. The stations can be combined with conveyors. Preferably the substance enters the line at its entrance and then passes successively all stations of the respective line until it finally exits the line.

Another preferred or inventive embodiment of the present invention is therefore a production line, particularly a food production line comprising the inventive apparatus.

Preferably, the inventive apparatus is provided downstream from a hopper in which, for example, a batch of an edible material is stored.

According to another preferred embodiment, the inventive apparatus is provided together with a former and/or a batter, preferably in one line.

Preferably the inventive processing apparatus, particularly the radiation can be at least partially isolated from the ambient by one or more valves. The edible product enters the apparatus, for example by means of a conveyor. Then the conveyor is stopped and a valve, like a gate is closed, preferably at the entrance and at the exit of the conveyor, so that no or little radiation can exit from the apparatus to the ambient. After the RF-treatment, the valve/gate is reopened again and the treated product can exit the apparatus and preferably simultaneously untreated product enters the apparatus.

The problem is also solved with a method to treat a substance with radio-frequency waves, wherein the radio-frequency waves are provided with one or more solid-state radio frequency source(s).

The disclosure made regarding this subject matter of the present invention also applies to the other invention and vice versa. Subject matters disclosed regarding this invention can also be combined with subject matters from other inventions of the present application.

The substance to be treated can be an edible substance, for example meat, fish or dough. The substance can also be an insect, which is, for example, killed by the RF-radiation.

Preferably the substance is transported from an inlet of a treatment apparatus to an exit of the same apparatus which are spaced apart.

The substance can be transported continuously and or intermittently. They can be transported as a string or as individual portions.

Preferably one or more sensors are provided which measure one or more properties of the edible product and/or the radiation reflected from the product. The product-properties are preferably measured at least twice during its treatment with RF-radiation. The changes of the properties are determined and can be taken into account when controlling the solid-state radio frequency source(s).

Preferably, the substance is heated, cooked, dried, disinfected and/or pasteurized, sterilized.

Transistor technology generates powerful RF fields. Preferably multiple RF sources will be applied, the sources can be controlled individually and preferably related to each other. For instance, in an application pumping a mass through a tube, gradually heating of the substance can be achieved by controlling the electromagnetic fields by controlling the power level, frequency and phase versus time with such precision that an even energy distribution will be achieved. In general, in case of a change in load in a certain spot of the product, mass, product flow or mass flow, the controller can control the specific parameters parameter in that certain spot in order to correct the adverse effects of the load change. For instance, during cooking the load will change constantly, this change in load will be detected via the antenna by measuring the reflected energy. The control system will compare the transmitted energy via the antenna with the reflected energy and will consequently adjust the energy to be transmitted by the antenna. For instance, if no load is present within the product chamber, no energy will be absorbed, the antenna receives the reflected energy and the control unit will stop transmitting new energy to the product chamber. With solid-state RF energy sources, the amplitude, the frequency and the phase can be controlled for each and every antenna. Such an advanced energy management system based on a fast response to the heat demand in certain spots of the product(s) to be heated prevents damaging of internal component and prevents an uncontrolled product treatment with uneven energy distribution. Due to the efficient use of energy resulting in less energy loss an additional advantage of solid-state RF energy sources is an increase in yield of products to be treated The inventions are now explained according to the Figures. The explanations apply for all embodiments of the present invention likewise.

FIGS. 1a-d show a first embodiment of the present invention.

FIGS. 2a and 2b show a second embodiment of the present invention.

FIGS. 5a-d show a line with a hopper and the inventive apparatus.

FIGS. 6a-d show the inventive apparatus with one or more valves.

FIGS. 7a-c show the inventive apparatus in combination with a conveyor.

Figure 1A:
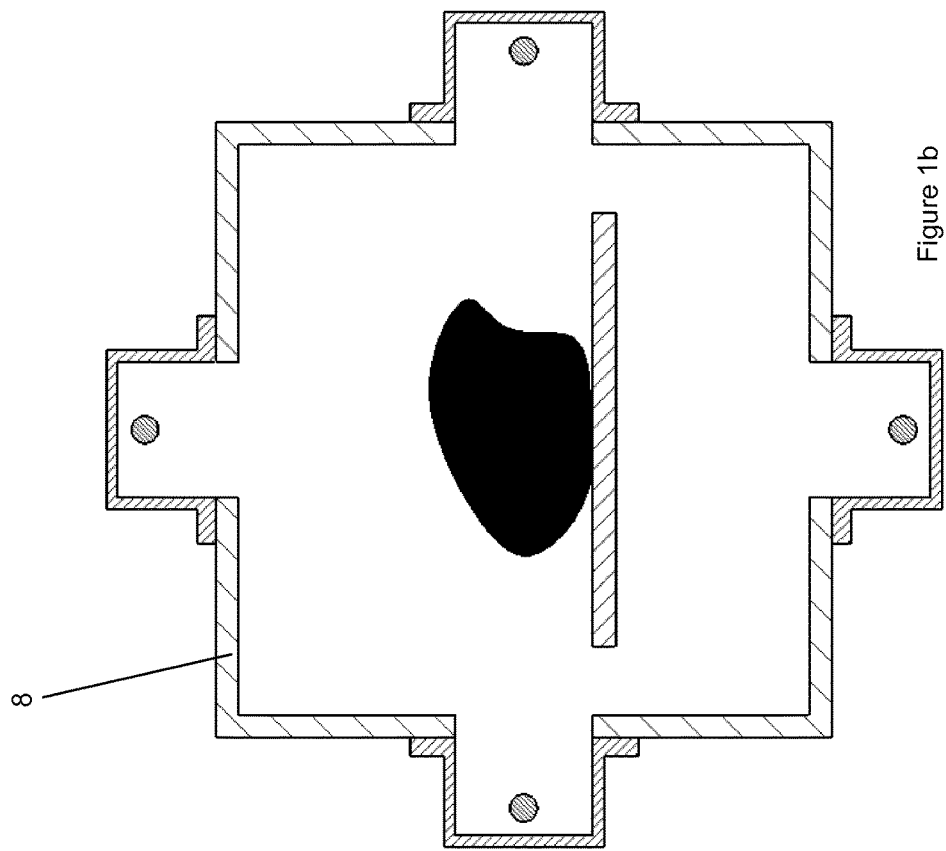
Figure 1B:
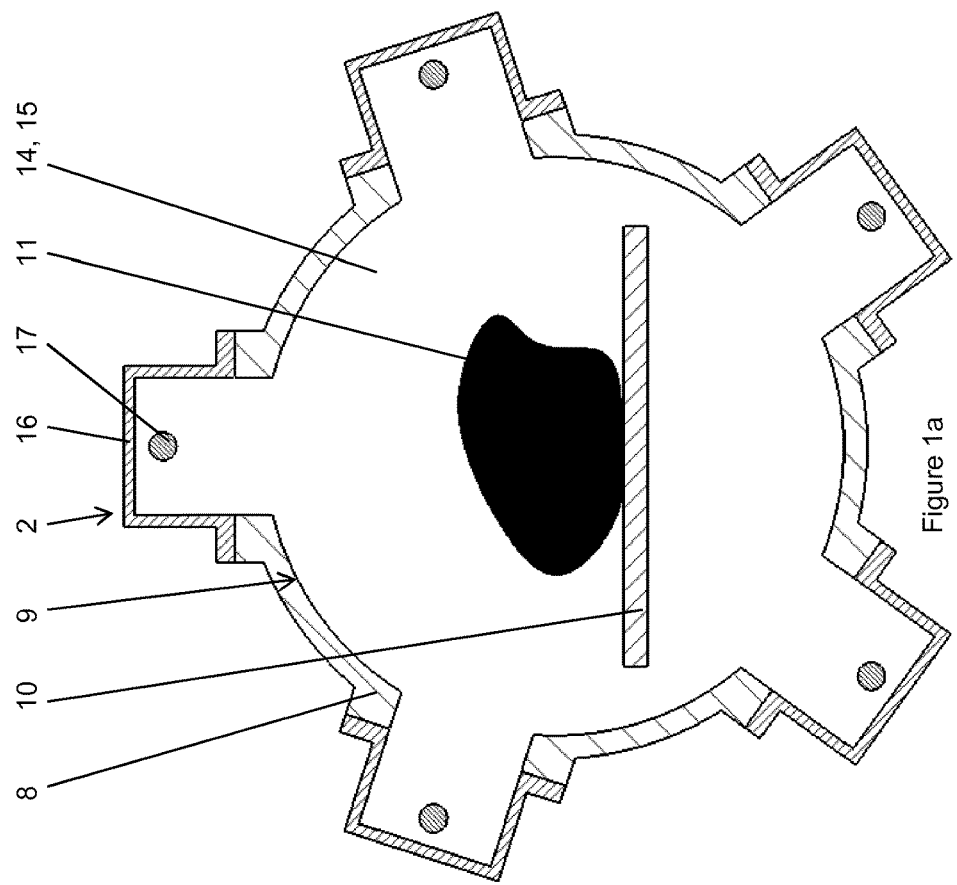
Figure 1D:
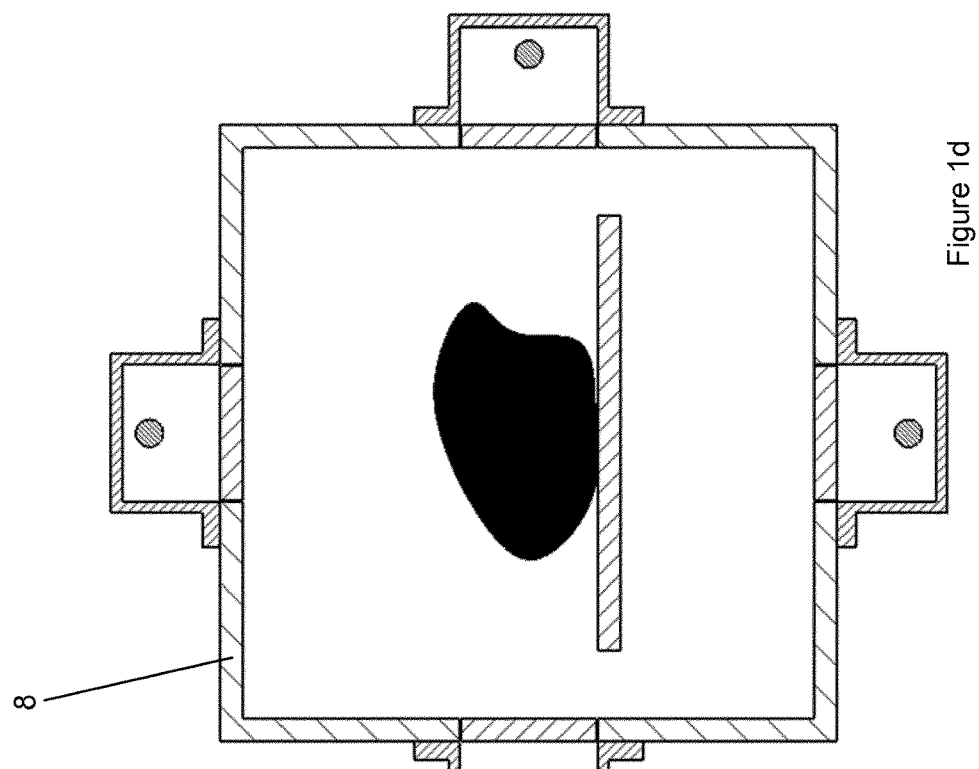
Figure 1C:
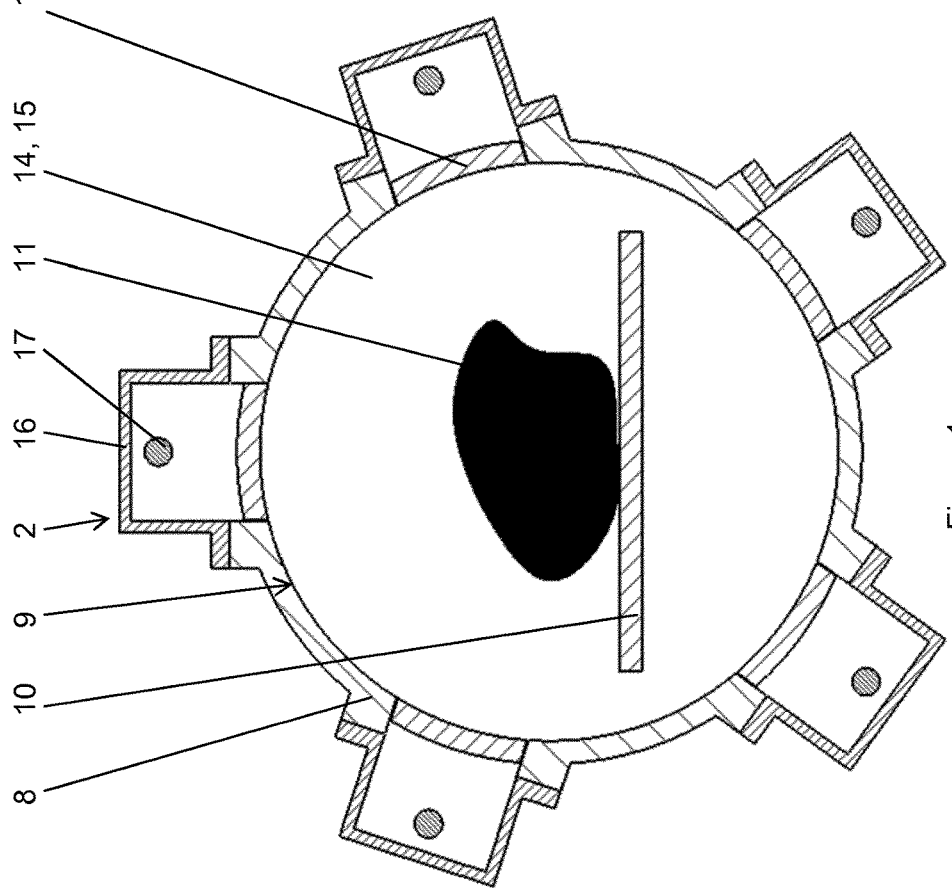

A first embodiment of a solid-state RF energized microwave apparatus is depicted in FIG. 1a, which comprises one, but preferably multiple solid-state RF sources 2 which among other things each comprises a waveguide 16 and/or an antenna 17. In the present case, the inventive apparatus comprises a multitude of solid-state RF sources 2, which are provided at the circumference of a product chamber 14 and preferably, equidistantly. The number of sources 2 in circumferential direction can depend on the efficiency, of the microwaves to heat up product 11 evenly, measured for example the temperature rise per unit of time. In this embodiment, the chamber 15 in which the solid-state RF sources 2 are located and the product chamber 14, in which the product to be treated/heated is provided are one and the same chamber and are defined by housing 8. The housing can be similar to a Faraday cage to prevent electromagnetic waves coming out of the housing. At least inner wall 9 but preferably the entire housing 8 can be made of steel, for instance stainless steel. Conveyor means 10 for instance a conveyor belt is positioned within housing 8 and conveys product 11, e.g. a formed food product, through housing 8. However, it is also possible to place a batch product into the product chamber, treat it with RF-radiation and remove it, once the treatment is terminated. The placement of the batch can be executed by motor means. FIG. 1*b* depicts a square design of housing 8. FIG. 1*c* is an embodiment of FIG. 1*a* and FIG. 1*d* is an embodiment of FIG. 1*b* and both are provided with preferably microwave transparent insert 12 in order to prevent that particles from product 11 will come in contact with the solid-state RF energy sources. In this embodiment the shielding means are designed circular and co-radial with inner wall 9 of housing 8. The design of the shielding means is not limited to this design, for instance flat shielding means is also possible but due to hygienic reasons not preferable. Other than that, the explanations regarding FIG. 1*a* also apply to FIG. 1*b*.

FIGS. 2*a* and 2*b* depict a second embodiment of the inventive apparatus, wherein in contrast to the embodiments according to FIGS. 1*a* and 1*b* microwave tube 12 is provided. The explanations given regarding the embodiment according to FIGS. 1*a* and 1*b* also apply to this embodiment. The microwave tube 12 separates the product chamber 14 from the chamber 15, in which the solid-state RF sources 2 are located. The tube material is preferably transparent for microwaves supplied by the solid-state RF sources 2 and more preferably do not absorb microwave energy and will therefore not be heated up by the microwave energy but, if any, only heated up by the warmed-up product. To effectively convert the microwave energy into increased temperature of the edible product to be heated, the material of the tube 12 is not be metal, but certain plastic materials are suitable. Product 11 is located within the product chamber 14 and will be treated, preferably heated by one preferably multiple solid-state sources 2 located in chamber 15. This embodiment is, for example, preferred in case cleaning agents used to clean product chamber 14 may not be come in contact with the solid-state sources 2. The tube 12 can also be used to direct the product past the solid-state RF sources 2. In this case, the product touches the inner circumference of tube at least locally. This embodiment of a solid-state RF energized microwave apparatus is depicted in FIGS. 3 *a* and 3*b*. One, but preferably multiple solid-state RF sources 2 are positioned around microwave tube 12 through which an edible mass 4, for instance minced meat.

Figure 3B:
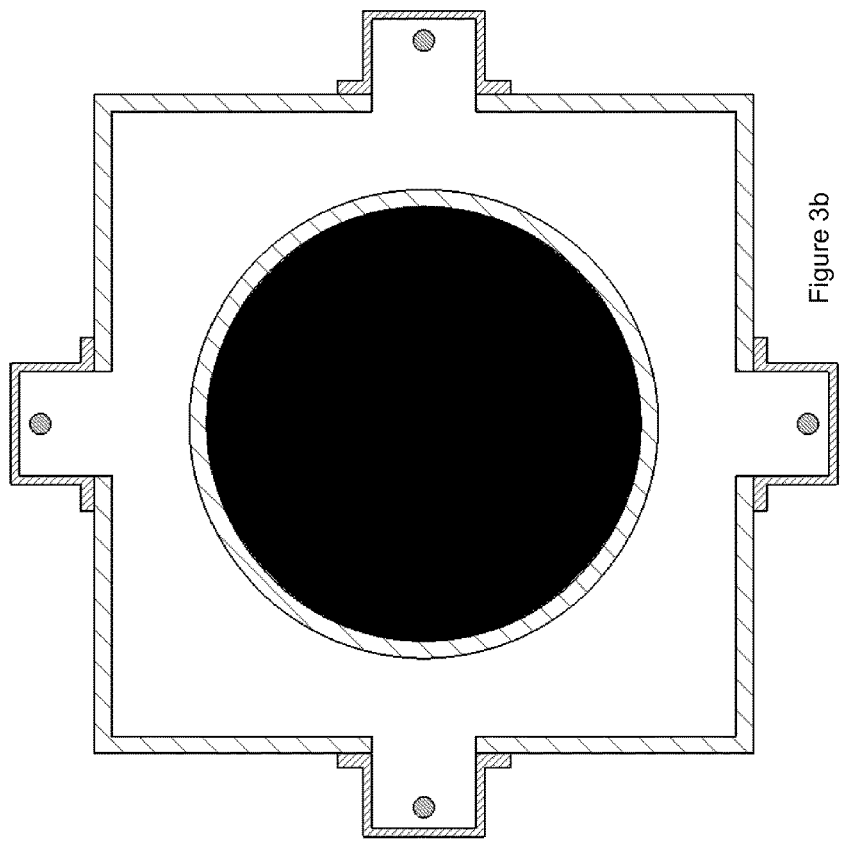
FIGS. 3a and 3b show a third embodiment of the present invention.
Figure 3A:
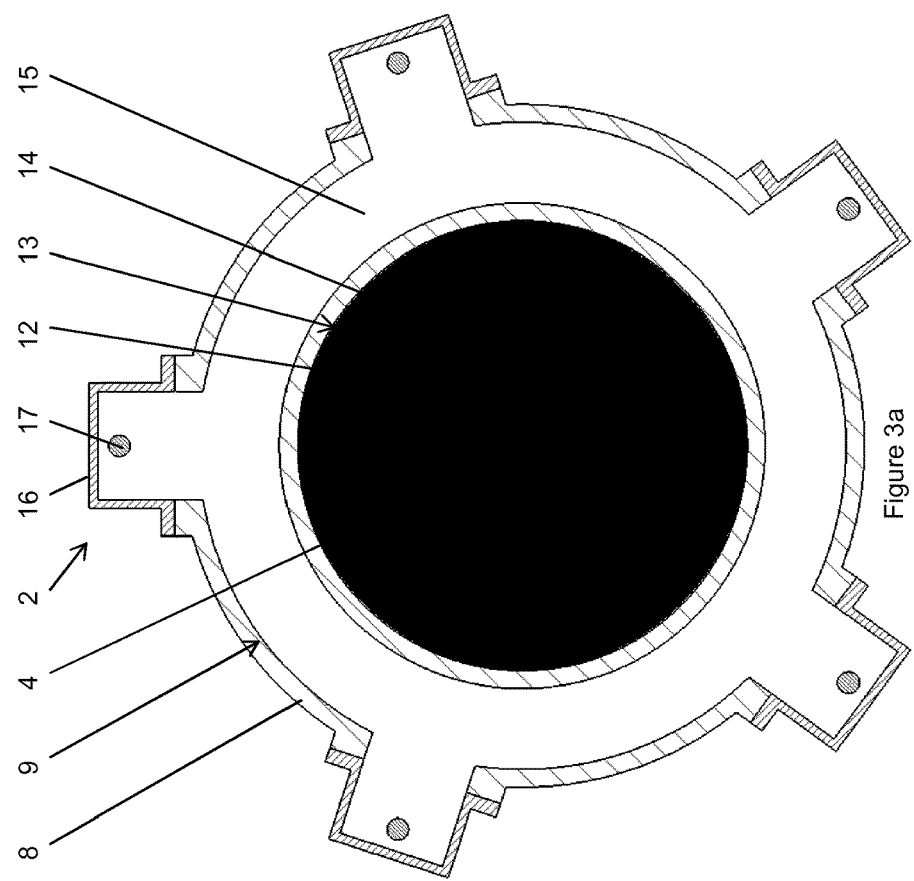
Figure 4B:
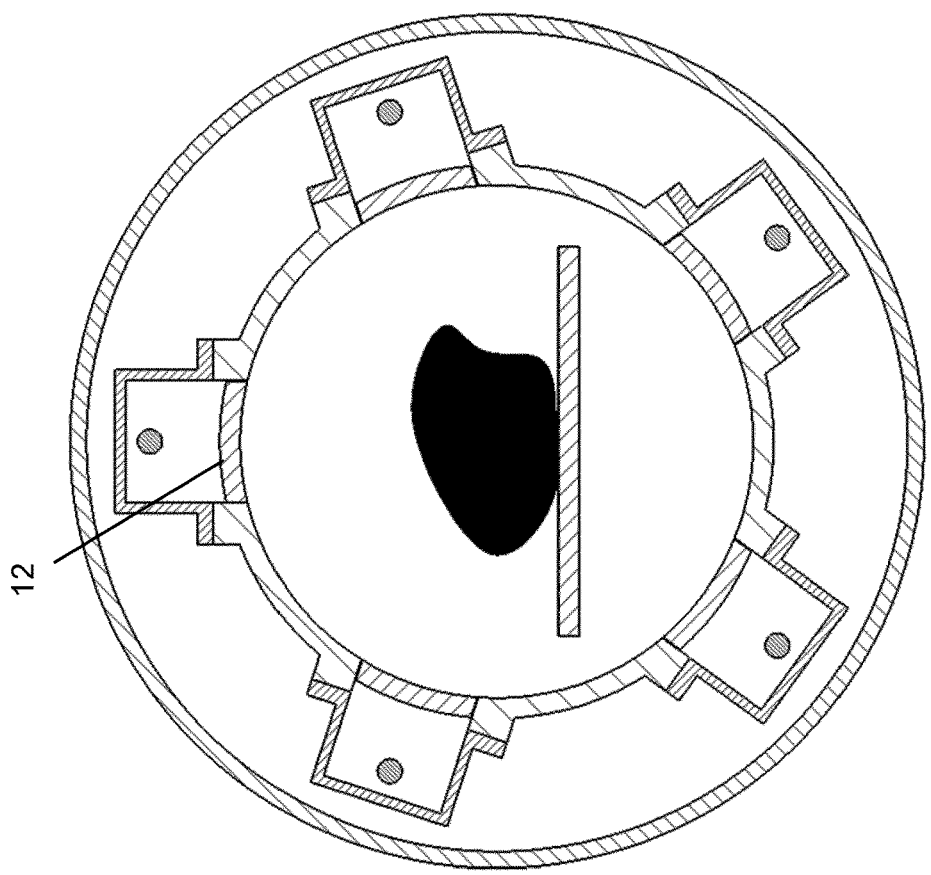
FIGS. 4a and 4b shows a fourth embodiment of the present invention.
Figure 4A:
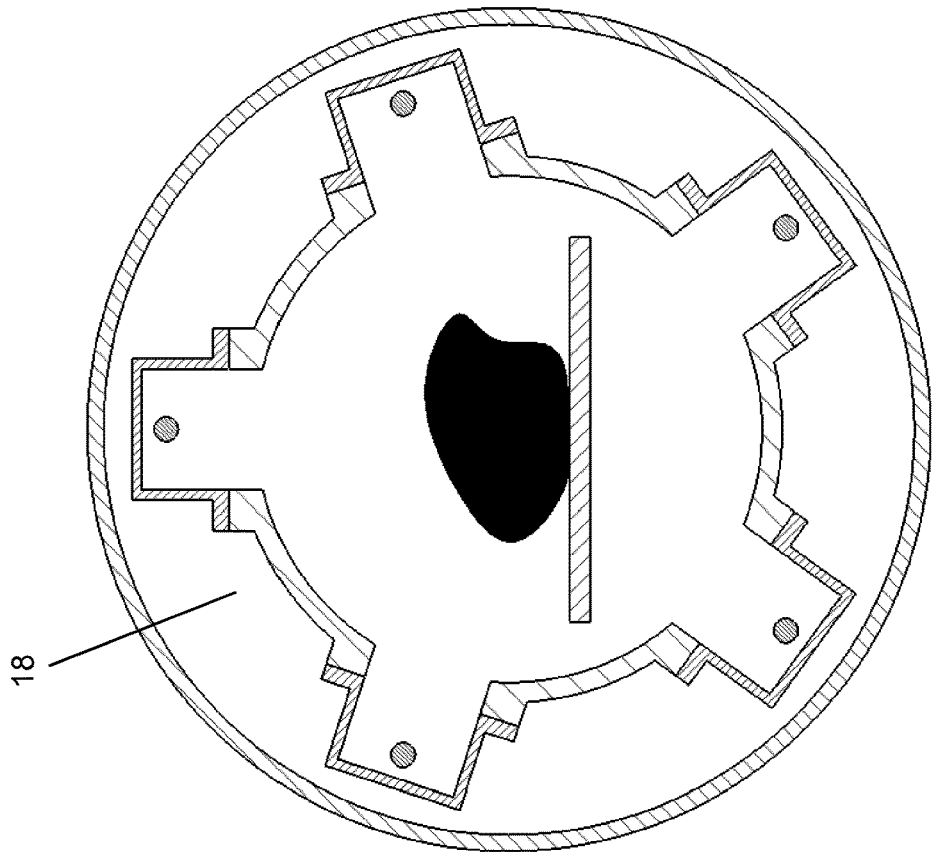

FIG. 4*a* and FIG. 4*b* (with microwave transparent insert 12) depicts an embodiment related to FIG. 1*a* but will also apply to the embodiments according to FIGS. 1*b*-3*b* wherein a cooling chamber 18 is provided which is connected to a cooling circuit for instance a water cooling or a gas-, preferably air cooling circuit. The cooling chamber 18 surrounds the apparatus as depicted in one of FIGS. 1*a*-3*b*. While applying solid-state RF energy sources, microwave energy will be transmitted to a certain spot of the product to be treated only when needed. Despite this efficient energy management additional cooling of the waveguides and connected antennas may be desirable in case of high energy output, for example during a long period of time. In another not depicted embodiment also the solid-state RF energy source will be cooled as well as the power supply. This can be done per RF energy source as needed. The cooling of the RF energy source(s) is preferably controlled by a temperature measurement, which measures the temperature of one or more of the RF energy source and based on this reading controls a fluid flow of the cooling agent and/or its temperature.

Figure 5D:
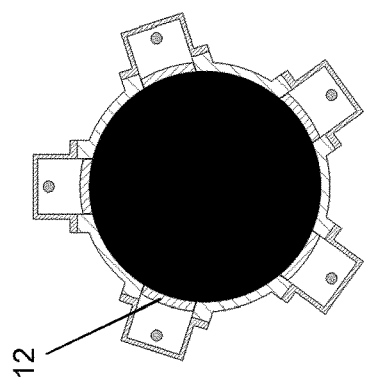
Figure 5C:
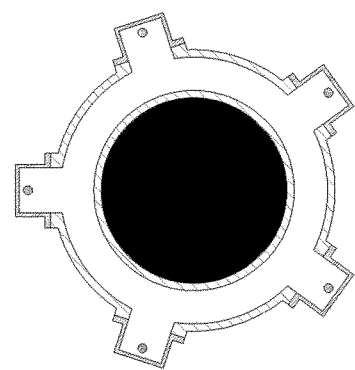
Figure 5B:
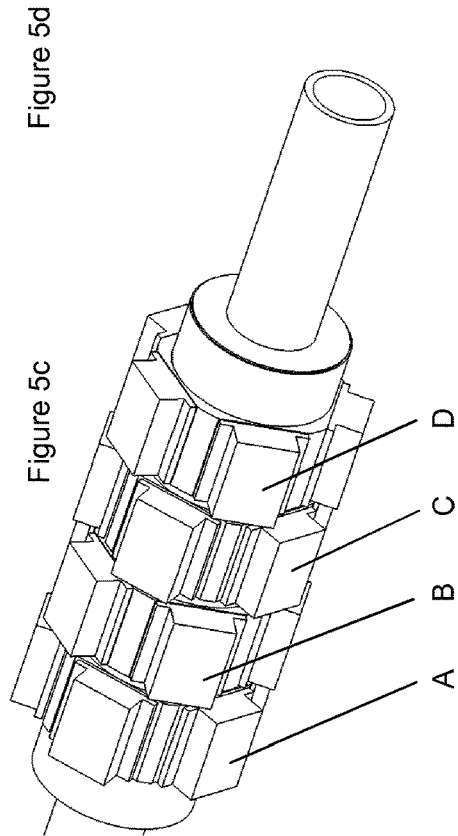
Figure 5A:
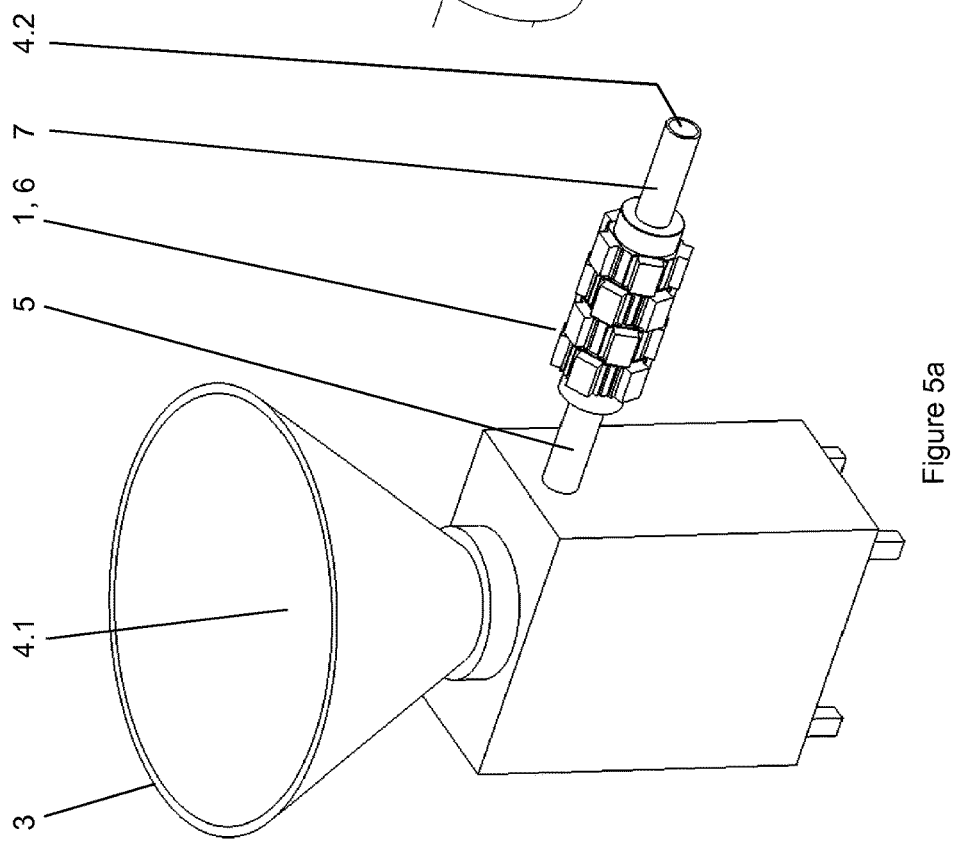

FIGS. 5*a*-5*d* depicts a first application of the solid-state RF energized microwave apparatus in a line. A mass supply system 3 such as a grinder, hopper or a stuffer, for example comprising a positive displacement pump which forces the cold edible mass 4, preferably through a supply section 5, to a microwave section part 6 of the inventive apparatus 1 to inline heat the pumpable substance and from there the heated mass 4 is discharged via discharge section 7. A further process step can be extraction of fats and other usable ingredients. The food mass for instance ground pork belly or vegetarian food can be transported continuously or intermittently/batch wise. The flow can be controlled depending on the residence time needed to achieve a certain temperature rise in the food product. The tube via which the food mass is pumped may comprise means to mix the product, for example a static- and/or dynamic mixers. There may be a or multiple sensor(s) provided to measure, for example, the temperature rise. FIG. 5*b* depicts the arrangement of the solid-state RF heat sources 2, here in four rows A, B, C and D. Each row comprises a multitude of, preferably equidistantly, arranged solid-state radio frequency sources, wherein here, the rows are staggered relative to each other. A cross-sectional view of row B of the microwave section 6 is depicted in FIG. 5*c* and can be similar as depicted in the embodiment according to FIG. 3*a*. In FIG. 5*d* microwave transparent inserts 12 are used to prevent that the solid-state RF energy sources 2 will come into contact with the mass. In order to further optimize the heat distribution to the mass flow and to prevent both "cold-spots" and "hot-spots", the number of cylindrical solid-state radio frequency source arrangements, here rings, can be increased in number, from here four to >four.

Figure 6C:
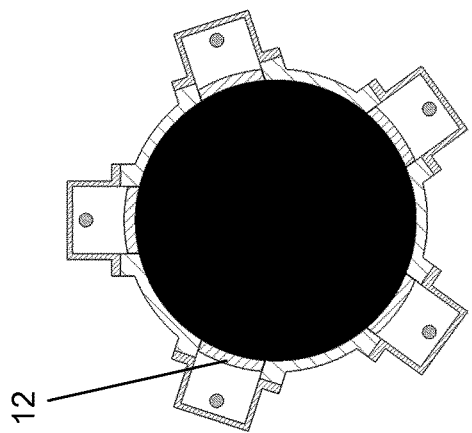
Figure 6B:
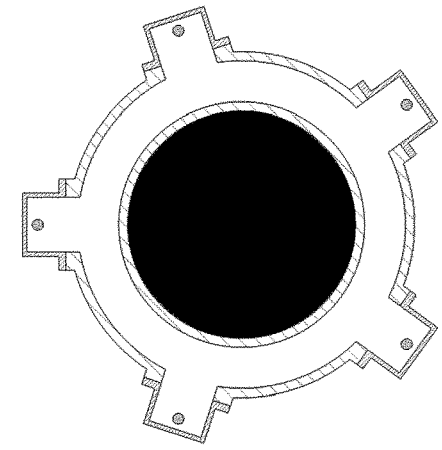

A second application of the solid-state RF energized microwave apparatus is related to the heating and/or killing of insects. The insects are utilized as substance. Currently insects will be immersed in a bath of boiling water and after the insects are killed they will be conveyed for the next process step. In an embodiment of the invention depicted in FIG. 6*a* insects 4 will be supplied to mass supply system 3, here a hopper or a trough. The valve 19 downstream from the microwave section is closed and valve 19, upstream from the microwave section is open to receive the insects within microwave section 6 of microwave apparatus 1. The microwave apparatus will be started and after the insects are killed the downstream valve 19 will be opened and insects can be conveyed via for instance a conveyor to a further processing station. A cross view of row B in microwave section 6 is depicted in FIG. 6*b* and FIG. 6*c*.

Figure 6D:
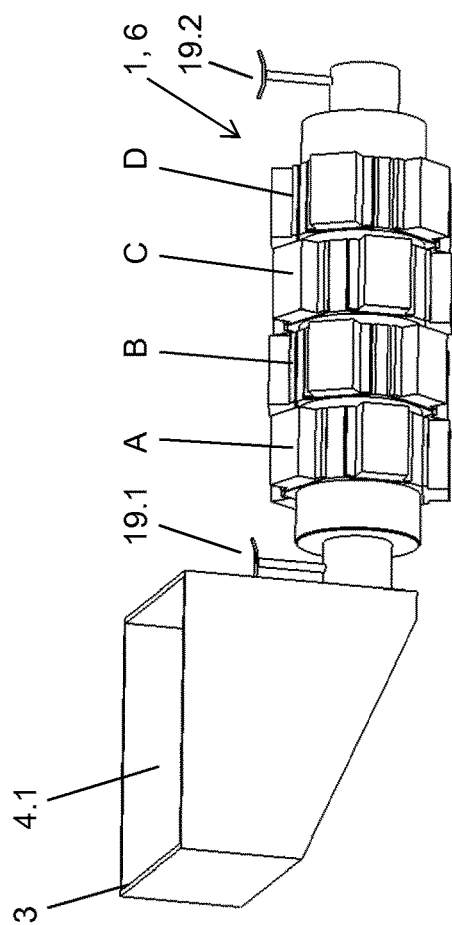
Figure 6A:
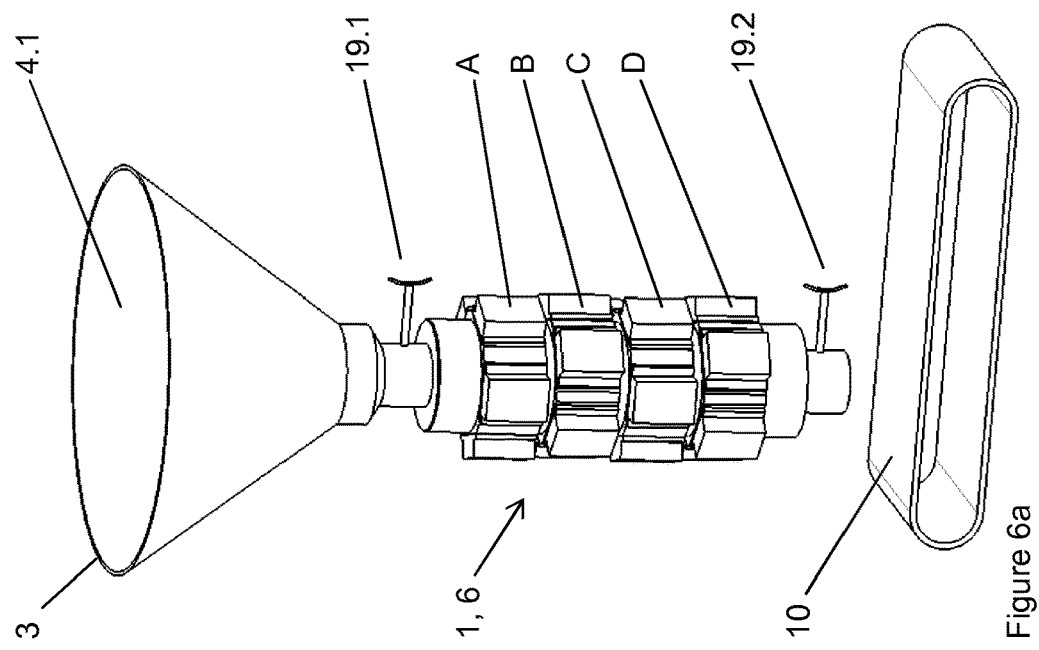

In another embodiment of the invention the insects 4 will be immersed in a mass supply system 3 provided with fluid, preferably water as depicted in FIG. 6*d*. From there on the fluid together with the immersed insects will be conveyed to microwave apparatus 1 comprising solid-state RF energy sources. Heating and killing of the insects will take place by subject the fluid and the immersed insects to microwave energy, either batch wise or in a continuous movement through the microwave apparatus. In case of a continuous process means should be applied to prevent the microwaves from escaping out of microwave section 6. This can be done by a valve, a gate or the like. It can also be done by a radiation which neutralized the radiation escaping from the inventive apparatus. A cross-sectional view of row B in microwave section 6 is depicted in FIGS. 6b and 6c. In a next process step the insects can be filtered from the fluid and/or separated in another way. The water can be recirculated.

In a further embodiment of the invention the insects 4 will be deposited on a conveyor as depicted in FIG. 7a and from there on conveyed to microwave apparatus 1. A cross view of row B in microwave section 6 is depicted in FIG. 7b and is similar to FIG. 1a. The embodiment of FIG. 7c is comparable to FIG. 1c. The person skilled in the art understands that the apparatus according to FIG. 7 can also be utilized to treat a formed substance like patties with microwaves. The products 4 then depict the patties. The valves in FIG. 7 are not mandatory.

All embodiments depicted in FIGS. 1-7 can be carried out in an apparatus with solid-state RF energy technology designed for batch operation as well as designed for continuous operation. Batch operation demands an apparatus with at least one gate, for example a door, through which the mass 4 or product 11 to be treated can enter the treatment section 6. In case the apparatus comprises a second gate the mass or product can removed from the treatment session via this second gate.

An apparatus with solid-state RF energy technology designed for continuous operation is depicted in FIG. 5. At least treatment section 6 but also supply section 5 and discharge section 7 can be part of one and the same tunnel-like apparatus. If not needed, they can be omitted. Transportation of mass 4 or product 11 can take place via suitable conveying means. For all embodiments above the number of rows provided with solid-state RF energy sources 2 is not limited to four rows.

For all embodiments above the design of housing 8 is not limited to a circular design as for instance depicted in FIGS. 1a, 2a and 3a but can be shaped differently as depicted in FIGS. 1b, 2b and 3b. Important is that heat treatment of product 11 or mass 4 will not adversely affected by the bouncing microwaves via inner wall 9 of housing 8.

For all embodiments depicted above the design of microwave tube 12 is not limited to a circular design but can be shaped differently. Especially in case a mass 4 flows through a tube as for instance depicted in FIG. 3a the circular design is advantageous with respect to pressure distribution. Preferably inner wall 13 should be provided with smooth walls in order to reduce shear forces on the food mass and to facilitate cleaning. Microwave tube 12 is preferably a fixed part within the depicted assembly and is isolated with respect to housing 8 and solid-state RF energy sources 2 which would be advantageous with respect to hygiene. Cleaning of the microwave tube can be done manually but preferably by an integrated CIP system.

LIST OF REFERENCE SIGNS

1 processing apparatus, industrial processing apparatus
2 solid-state RF energy source
3 mass supply system, hopper
4 mass, edible mass, food mass, insects
5 supply section, entrance
6 microwave section, treatment section
7 discharge section
8 housing.
9 inner wall housing 8
10 conveyor means, belt
11 product, food product, substance, food substance
12 microwave chamber, microwave transparent tube, microwave transparent insert
13 inner wall microwave tube 12
14 product chamber
15 solid-state source chamber
16 waveguide
17 antenna
18 cooling chamber
19 valve
20 exit
21 inlet
22 shielding means, movable shielding means
23 frame
A solid-state RF energy source
B solid-state RF energy source
C solid-state RF energy source
D solid-state RF energy source

The invention claimed is:

1. Method to treat a substance with radio-frequency waves comprising:
   transporting the substance with a conveyor through a food chamber of a processing apparatus, and
   heating the substance within the food chamber with a multitude of solid-state radio frequency sources, each one of the multitude of solid-state radio frequency sources comprises a radio-frequency power amplifier that drives an antenna for transmitting microwaves, the antenna is located in a waveguide, which guides the microwaves towards the substance in the food chamber to heat the substance, wherein the food chamber is at least partially transmittable for RF-radiation, the RF-radiation is isolated from ambient via one or more valves of the processing apparatus,
   wherein the multitude of solid-state radio frequency sources comprise four or more solid-state radio frequency sources that are equidistantly arranged around the conveyor and a circumference of the food chamber, and
   wherein the method further comprises: cooling the waveguides with a cooling chamber that is connected to a cooling circuit, wherein the food chamber and the multitude of solid-state radio frequency sources are located within the cooling chamber, wherein the cooling step comprises: measuring a temperature of one or more of the multitude of solid-state radio frequency sources and then based on the measured temperature of the one or more of the multitude of solid-state radio frequency sources, the method comprises: controlling a fluid flow of a cooling agent and/or a temperature of the cooling agent in the cooling chamber and around the food chamber and the multitude of solid-state radio frequency sources.

2. Method according to claim 1, wherein the substance is transported from an inlet to an exit which are spaced apart and, optionally, the substance is transported continuously and or intermittently.

3. Method according to claim 1, wherein the multitude of solid-state radio frequency sources comprise one or more sensor(s), and the one or more sensor(s) measure(s) one or more properties of the substance and/or radiation reflected from the substance.

4. Method according to claim 3, wherein a signal from the one or more sensor(s) is utilized to control the multitude of solid-state radio frequency sources.

5. Method according to claim 1, wherein the substance is heated, dried, disinfected, pasteurized, sterilized and/or killed.

6. Method according to claim 5, wherein the substance comprises at least parts of an insect or a mixture of insects.

7. Method according to claim 6, wherein the insects are supplied alive to the processing apparatus or are killed by the microwaves.

8. Method according to claim 1, wherein the food chamber has a circular cross section, and the multitude of solid-state radio frequency sources are provided in an array of n columns and m rows in which the n columns are arranged in a peripheral direction of the food chamber and the m rows are arranged in a transport direction of the conveyor, wherein n is an integer ≥5 and m is an integer ≥2.

9. Method according to claim 1, wherein the multitude of solid-state radio frequency sources are provided symmetrically with respect to a neutral plane orthogonal to a transport plane of the conveyor.

10. Method according to claim 2, wherein the inlet and the exit are spaced apart from each other in a transfer direction of the conveyor.

11. Method according to claim 1, wherein the processing apparatus comprises one or more sensors and a control system, wherein the method comprises:
    measuring, with the one or more sensors, microwaves that are reflected from the substance,
    comparing, with the control system, transmitted microwaves to the reflected microwaves, and
    adjusting with the control system, based on the comparison, any additional microwaves to be transmitted towards the substance.

12. Method according to claim 1, wherein the multitude of solid-state radio frequency sources are spaced 90 degrees apart or 72 degrees apart.

13. Method according to claim 1, wherein the processing apparatus comprises a mixing device, the mixing device is a static mixer.

14. Method according to claim 11, wherein the one or more sensors sense microwaves that are absorbed by the substance.

15. Method according to claim 11, wherein the processing apparatus comprises a pump, and the method comprises controlling the pump based on a signal from the one or more sensors, and a capacity of the pump is increased or decreased to alter a residence time of substance in the food chamber.

16. Method according to claim 1, wherein the method comprising stopping transmission of the microwaves when no energy is absorbed in the food chamber.

17. Method according to claim 16, wherein no microwaves are absorbed in the food chamber when no load is present in the food chamber, and wherein the substance is an animal raw fat material that is transported continuously and/or intermittently prior, during and/or after the heating.

18. Method according to claim 1, wherein the processing apparatus comprises a supply section and an opposing discharge section, the multitude of solid-state radio frequency sources are arranged in a plurality of circumferential rings extending around a longitudinal axis of the processing apparatus between the supply section and the opposing discharge section, wherein the multitude of solid-state radio frequency sources in one of the plurality of circumferential rings are rotationally staggered about the longitudinal axis relative to the multitude of solid-state radio frequency sources in an adjacent one of the plurality of circumferential rings.

19. Method according to claim 1, wherein the processing apparatus comprises a shield between the substance and the multitude of solid-state radio frequency sources configured to prevent particles from the substance from coming into contact with the multitude of solid-state radio frequency sources.

20. Method according to claim 19, wherein the shield comprises a transparent insert having a circular shape and an inner surface of the transparent insert is co-radial and flush with an inner wall of the food chamber.

* * * * *